June 17, 1969  R. L. FOSSIER ET AL  3,450,593
PANEL HAVING RIMS BONDED WITH GLASS FIBERS AND POLYESTER RESIN
Filed Dec. 15, 1965
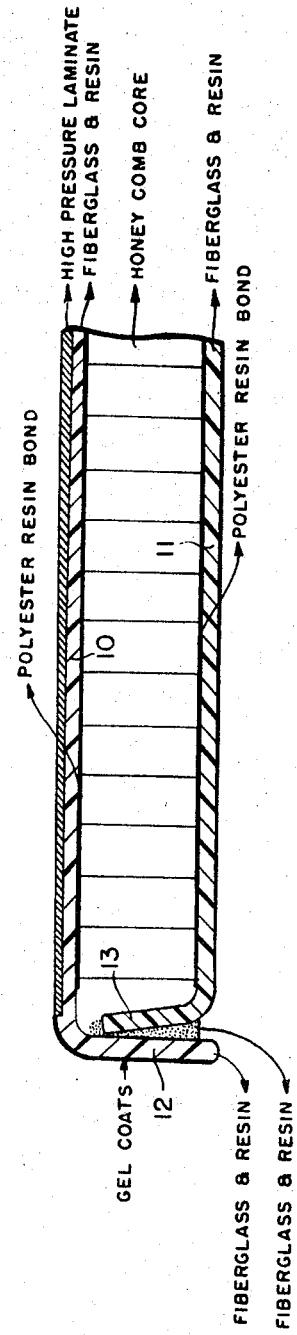
INVENTORS:
RALPH L. FOSSIER
JOHN W. KRUISSINK
BY: Dawson, Tilton, Fallon, Lungmus & Alexander
ATT'YS 3,450,593
PANEL HAVING RIMS BONDED WITH GLASS FIBERS AND POLYESTER RESIN
Ralph L. Fossier, La Grange Park, and John W. Kruissink, Des Plaines, Ill., assignors to Dentin Manufacturing Company, Melrose Park, Ill., a corporation of Illinois
Continuation-in-part of application Ser. No. 413,594, Nov. 24, 1964. This application Dec. 15, 1965, Ser. No. 513,969
Int. Cl. B32b *3/12, 27/36, 17/04*
U.S. Cl. 161—43                                                7 Claims

ABSTRACT OF THE DISCLOSURE

A panel structure is formed by molding separately two pans formed of glass fibers and polyester resin, each with inwardly-turned rims, the rims being brought into facing and generally nested relation with the rims meeting each other at an angle to provide a pocket therebetween. The pocket is filled with polyester resin and glass fibers to unite the pans while forming rigid border portions. A honeycomb paper core wet with phenolic resin is preferably united to the bottom core and in the assembly of the pans the upper pan is inverted and placed upon a flat surface and the lower pan with its honeycomb core is pressed against the top pan and the structure cured.

---

This invention relates to a panel, and more particularly to panels useful for tables, desk tops, doors, and other types of panels.

This application constitutes a continuation-in-part of our copending application Ser. No. 413,594 filed Nov. 24, 1964.

In the formation of a panel for use as a table or similar structures, it has been considered necessary to provide a perimetric frame as a support for the structure. Such frame not only adds to the weight, but represents a substantial cost in the panel manufacture.

We have discovered that extremely sturdy panels can be produced without the use of a perimetric frame and through the combination of pan-like bodies or panels which have inwardly-turned rims brought into nested or telescoping relation, and by employing for the pan-like panels glass fibers and resin and uniting the rims of such panels with glass fibers and resin, a unitary or integral structure is produced having great strength while being relatively light in weight.

A primary object, therefore, of the invention is to provide a panel structure formed of a minimum of parts and possessing great strength while being light in weight. A further object is to provide a structure in which the nested rims of panels are united in an integral manner to provide a sturdy, perimetric frame for the panel structure. Yet another object is to provide a panel of unique structure and a novel method for assembling the same. Other specific objects and advantages will appear as the specification proceeds.

The invention is shown in an illustrative embodiment by the drawing in which a broken sectional view of the panel structure embodying our invention is set out.

In the illustration given, we provide two glass fiber and resin pan-like bodies or panels 10 and 11. These panels have inwardly-tnrned and nested rims 12 and 13 which are also formed of glass fibers and polyester resin, and between the nested rims is a glass fiber and resin bond.

The panel may be formed with or without a core structure. In the illustration given, a honeycomb core formed of paper impregnated with phenolic resin is placed between the panels and united thereto by polyester resin bond. It will be understood that any other suitable core may be employed between the glass fiber and resin pan-like bodies.

In the illustration given, a high-pressure laminate is bonded to the upper glass fiber and resin body. This high-pressure laminate, as described in detail in our co-pending application Ser. No. 413,594, comprises a number of sheets impregnated with phenolic resin, with the top sheets impregnated with melamine resin, one of the top sheets being preferably imprinted with a design and the design protected by a cover sheet preferably formed of rayon paper impregnated with melamine. In the practice of our present invention, the panel may be made with or without the high-pressure laminate above described.

In the operation of our invention, the glass fiber and resin pan-like panels having inwardly-turned rims are formed through the use of liquid polyester resin and glass fibers. These are preferably combined in the proportion of about one part of fibers to three parts of resin by weight, or in other suitable proportions, and preferably containing a catalyst, such as methyl ethyl ketone. The resulting panel may be subjected to low pressure, such as, for example 5 to 6 pounds, and the panel cured at temperatures of about 70–125° F. to form a rigid, pan-like panel, as shown in the drawing.

The pan-like panels are then brought together with their rims in nested or telescoping relation and the space between the rims filled with glass fibers and polyester resin. If desired, a honeycomb core or the like may be inserted between the pan-like panels and a polyester resin bond provided between the panels and the core to unite the core to the panels. The entire structure is then cured, as above described, preferably at low pressure and at temperatures of about 70–125° F. to form a rigid, integrated panel, as shown in the drawing.

In order to protect the rim portions, at least, of the outermost panel, we coat the rim with gel coat, which is a resinous paint, rendering the surface impervious to sun rays. Should the high-pressure laminate not be used, the gel coat would also be applied to the top surface of the finished product.

The chopped glass fibers which are employed in the fabrication of the structure may be carried in any suitable resin which will thermoset under curing to form a flexible or elastic body, such as, for example, polyester resins, epoxy resins, etc.

In order to render the border portion of the finished panel structure rigid, while at the same time presenting a finished appearance, we prefer to have the rim of the upper or outer pan-like body turned downwardly in a generally straight direction, as shown in the drawing, while the rim of the lower panel or body is turned upwardly and outwardly in a flared direction to provide a pocket or space between the rims for receiving the glass fibers and polyester resin. On curing, the unitary resulting panel has a substantially rigid border forming, in effect, a frame for the resulting table top or like panel structures.

Specific examples illustrating the invention may be set out as follows:

EXAMPLE I

In the manufacture of the high-pressure laminate shown in the drawing, kraft paper sheets, preferably having a basis weight of 100 to 104 pounds and a caliper of .010″ to 0.11″, were employed for the sheets and impregnated with phenol formaldehyde resin #23291, having a solids content of 65 to 68 percent, which is the percent of actual resin contained in a resin/alcohol solution, and having a viscosity range of 450 to 550 cps. The kraft paper sheet was treated with the phenolic resin to a resin content of 29 to 31 percent and a volatile content of 7.5 to 8.5 percent by passing the paper through a resin bath to pick up the desired amount of resin, and each sheet was then dried. The two top sheets of the laminate are preferably impregnated with melamine resin. The high-pressure laminate was then inverted and there was sprayed upon the bottom of the laminate a body consisting of glass fibers and polyester resin in the proportion of one part fibers and three parts resin. The resin was Pittsburgh #5180 polyester resin, and the fibers were Owens-Corning glass fibers. A small amount of methyl ethyl ketone was added as a catalyst. The sprayed material was cured under pressure of about 6 pounds in an oven until the material solidified in the shape shown, with the panel having a downwardly-turned rim. The bottom panel was similarly formed by combining glass fibers and polyester resin. The two panels were brought together, as shown in the drawing, and glass fibers and polyester resin introduced between the rims of the pan-like bodies. The entire structure was then cured under temperatures of about 80° F. under a pressure of about 5 pounds.

The finished, unitary structure was light, resilient, and extremely sturdy.

EXAMPLE II

The process was carried out as described in Example I except that the glass fibers were employed in a polyester Plaskon resin #430.

EXAMPLE III

The bottom pan or shell was formed by spraying into a fiberglass mold a fluid mixture of glass fibers, polyester resin and a catalyst, as described in Example I. Into the shell, the honeycomb core, formed of coiled paper impregnated with phenolic resin and while still wet with the resin, was pressed against the shell to form a good contact. The bottom shell and the honeycomb core were then cured at about 120° F. to form a rigid panel integrated and bonded with the phenolic core. The top shell was formed in a similar manner and cured. The top shell was then inverted and glass fibers and resin placed within the rim portion of it and the bottom shell, with the integrated honeycomb core placed within the inverted top shell. Additional glass fibers and resin were placed between the rim portions of the two shells. An inflated bladder or pneumatic cushion was then pressed firmly against the lower shell, while the top shell rested upon a flat surface. Under this pressure, the bottom shell conformed to the irregularities of the core and top shell so as to form a sturdy bond, while at the same time the pressure gave the top shell a flat, even surface. The combined structure was then cured to form the finished integrated panel.

While in the foregoing specification we have set forth a specific structure and procedure in considerable detail for the purpose of illustrating embodiments of the invention, it will be understood that such details may be varied widely by those skilled in the art without departing from the spirit of our invention.

We claim:

1. A panel structure comprising a pair of rigid, pan-like bodies formed of glass fibers and polyester resin, said bodies having inwardly-turned rims in facing and generally nested relation with the rims forming an inverted V space therebetween, and glass fibers and polyester resin filling said space between said rims and integrally bonding them together.

2. The structure of claim 1 in which a honeycomb core is enclosed between said pan-like bodies and bonded thereto.

3. The structure of claim 1 in which a gel coat covers at least the outer surfaces of said rims.

4. The structure of claim 1 in which the rim of the outer panel is substantially straight while the rim of the inner panel is turned upwardly and inwardly at an inclination to provide said space between said rims for receiving glass fibers and polyester resin to provide a non-flexing, rigid border border for said panel structure.

5. A panel structure comprising a pair of rigid, pan-like panels formed of glass fibers and polyester resin, said panels having facing inwardly-turned rims in nested relation and meeting each other at an angle to form a pocket therebetween, glass fibers and polyester resin in said pocket between said rims and bonding them together, a honeycomb core between said panels, and a polyester resin bond uniting said panels and said core.

6. In a method for forming a table panel, the steps of forming two pan-like panels of glass fibers and polyester resin, curing said panels, bringing the panels together with their rims in facing angular relation, introducing glass fibers and resin into the space between the nested rims, and curing the structure at temperatures between 70° and 125° F. to integrate the rims.

7. In a method for forming a panel, the steps of forming two shells of glass fibers and polyester resin with perimetric rims, pressing a honeycomb paper core wet with phenolic resin against the bottom shell, curing the core and shell to integrate same, inverting the top shell and placing the bottom shell with the core therein with the rims of the two shells in telescoping relation with an inverted V pocket therebetween, introducing glass fibers and resin into the pocket between the telescoping rims, pressing the bottom rim against the core and the top shell against a flat surface, and curing the structure at temperatures between 70° and 125° F. to integrate the rims.

References Cited

UNITED STATES PATENTS

| 2,911,274 | 11/1959 | Grube | 52—619 |
| 2,782,465 | 2/1957 | Palmer | 161—43 X |
| 3,021,916 | 2/1962 | Kemp | 52—615 X |
| 3,141,206 | 7/1964 | Stephens | 161—149 X |
| 3,223,056 | 12/1965 | Wilburn | 161—44 X |

FOREIGN PATENTS 739,334   10/1932   France.

EARL M. BERGERT, *Primary Examiner.*

P. A. KILLWORTH, *Assistant Examiner.*

U.S. Cl. X.R.

52—619; 161—68; 156—69, 293